(12) United States Patent
Ding

(10) Patent No.: US 12,216,691 B2
(45) Date of Patent: *Feb. 4, 2025

(54) SYSTEMS AND METHODS FOR SECURE STORAGE AND RETRIEVAL OF TRADE DATA

(71) Applicant: Bank of Montreal, Toronto (CA)

(72) Inventor: Jian Ding, Dublin, CA (US)

(73) Assignee: Bank of Montreal, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,147

(22) Filed: Jun. 20, 2023

(65) Prior Publication Data

US 2023/0350927 A1 Nov. 2, 2023

Related U.S. Application Data

(63) Continuation of application No. 17/834,613, filed on Jun. 7, 2022, now Pat. No. 11,681,731, which is a continuation of application No. 16/791,828, filed on Feb. 14, 2020, now Pat. No. 11,366,841.

(60) Provisional application No. 62/805,740, filed on Feb. 14, 2019.

(51) Int. Cl.
*G06F 16/33* (2019.01)
*G06F 16/332* (2019.01)
(Continued)

(52) U.S. Cl.
CPC ........ *G06F 16/3328* (2019.01); *G06F 16/334* (2019.01); *G06F 16/338* (2019.01);
(Continued)

(58) Field of Classification Search
CPC ... G06F 16/3328; G06F 16/334; G06F 16/338
See application file for complete search history.

(56) References Cited

U.S. PATENT DOCUMENTS 9,773,212 B2  9/2017  Hammad
10,552,823 B1  2/2020  Woodward et al.
(Continued)

OTHER PUBLICATIONS

Examination Report on CA Appl. Ser. No. 3072637 dated Apr. 19, 2021 (4 pages).

(Continued)

*Primary Examiner* — Loc Tran
(74) *Attorney, Agent, or Firm* — Foley & Lardner LLP

(57) ABSTRACT

Disclosed herein are embodiments of systems, methods, and products comprising a data power server for secure storage and retrieval of trade data. The server receives a request from a user to review or confirm one or more trade documents via a webserver. The server communicates with a connector grid server to retrieve the user's accessible documents. The connector grid server determines the electronic file IDs that are accessible to the user based on the accessibility policy. The server instructs a digital library server to download the electronic files containing the requested trade data. The digital library server retrieves and downloads the electronic files based on the file IDs. The webserver renders a GUI displaying the electronic files on an electronic client device operated by the user. Upon receiving the confirmation response from the user, the server instructs the digital library server to update the trade status.

17 Claims, 3 Drawing Sheets

(51) Int. Cl.
*G06F 16/338* (2019.01)
*G06F 21/31* (2013.01)
*G06F 21/62* (2013.01)
*H04L 67/01* (2022.01)

(52) U.S. Cl.
CPC .......... *G06F 21/31* (2013.01); *G06F 21/6218* (2013.01); *H04L 67/01* (2022.05)

(56) References Cited

U.S. PATENT DOCUMENTS

| | | | |
|---|---|---|---|
| 2002/0016838 A1* | 2/2002 | Geluc | H04L 63/101 |
| | | | 713/168 |
| 2010/0030818 A1* | 2/2010 | Cooper | G06F 16/273 |
| | | | 707/703 |
| 2013/0219176 A1 | 8/2013 | Akella et al. | |
| 2014/0197234 A1 | 7/2014 | Hammad | |
| 2015/0365469 A1* | 12/2015 | Procopio | H04L 67/10 |
| | | | 709/217 |
| 2016/0065571 A1 | 3/2016 | Hoyos et al. | |
| 2017/0111362 A1 | 4/2017 | Xie et al. | |
| 2018/0089183 A1* | 3/2018 | Schwartz | G06F 16/2255 |
| 2018/0349941 A1* | 12/2018 | Taylor | H04L 9/3221 |
| 2019/0260737 A1 | 8/2019 | Brown | |

OTHER PUBLICATIONS

Examiner's Requisition dated May 27, 2024 on CA App. 3,187,034 (10 pages).

* cited by examiner

SYSTEMS AND METHODS FOR SECURE STORAGE AND RETRIEVAL OF TRADE DATA

CROSS-REFERENCE TO RELATED APPLICATIONS

This application is a continuation application of U.S. application Ser. No. 17/834,613, filed Jun. 7, 2022, which is a continuation application of U.S. application Ser. No. 16/791,828, filed Feb. 14, 2020, which claims priority to U.S. Provisional Patent Application Ser. No. 62/805,740, entitled "System and Methods for Secure Storage and Retrieval of Trade Data," filed Feb. 14, 2019, which are fully incorporated herein by reference in their entirety.

TECHNICAL FIELD

This application relates generally to methods and systems for secure storage and retrieval of trade data.

BACKGROUND

Large institutions may facilitate large volume of trades for their users. For example, after a user initiates a trade request, the company may need to send a confirmation message comprising the trade information for the user's review before facilitating the trade. Conventional methods for sending the confirmation message utilize manual processes, such as sending the confirmation message via fax. For instance, an employee of the company may manually scan a printed document containing the trade information and transmit the scanned image of the document to the user.

The conventional solutions for trade data management have several technical shortcomings. For example, the confirmation process via fax message may be insecure and inefficient. The fax message containing the sensitive trade information may be printed at the receiving fax machine, which may be accessible by many people. Furthermore, this method may result in a delayed response. The conventional confirmation process may involve manual intervention, which is inefficient and error-prone for high volumes of data. As a result, many institutions utilize electronic verification where trade confirmation process is performed via a computer system. However, these computer-specific methods have revealed a new set of technical challenges. Trade information is highly sensitive. Therefore, it is important to limit the access to these documents to authorized users. Some existing methods store trade documents in a central server, which is undesirable because, in case of a cyber-attack, a security hacker may access these files more easily. Some existing methods store the trade documents in disparate data storages. While these methods minimize the risk of corruption or cyber-attacks, retrieval of data is less efficient utilizing these methods. For instance, a central server must retrieve files from different databases, which may be costly, time-consuming, or inefficient. Therefore, existing methods either sacrifice security or efficiency when storing/retrieving highly sensitive trade documents.

SUMMARY

For the aforementioned reasons, there is a need for a computer-implemented system and method that enables secure and efficient data management for large enterprises that may have high volume trade data. What is desired is a unique system architecture to securely store data without sacrificing efficiency. Embodiments disclosed herein address the above challenges by providing a system for secure storage and retrieval of trade data, where a customer/user may log into a user account of a website using his/her credential. The user may request to review the trade information in a PDF (portable document format) document displayed on a GUI (graphical user interface) of the website. The user may confirm the trade information by clicking a corresponding button in the GUI. Alternatively, the user may click a different button if the user disagrees with the trade information. A server of the company may receive the response of the confirmation once the user clicks the button. If the user clicks on the button to confirm the trade, the server may automatically change the status of the user's trade from unconfirmed to confirmed status.

Because the PDF documents include highly sensitive financial data, the embodiments disclosed herein may provide two layers of protection on such PDF documents. Specifically, the server may determine the accessibility of the requested documents based on the user credential, the user attributes, and request attributes and only display the documents accessible to the user. The server may need to communicate with a private server (e.g., connector grid server) to determine the accessibility of the documents. The private server may be a server managing the accessibility of a set of documents for each user. Furthermore, the server may store the trade documents in a private database managed by a separate private server (e.g., digital library server). After the server determines the accessible documents that are accessible to the user by communicating with the first private server that manages the accessibility of trade documents, the server may query the documents from the second private server that manages the storage of the trade documents.

In an embodiment, a method comprises receiving, by a first server from a user computing device via a webserver, a request having a set of attributes, the first server having a private internet protocol address, wherein the webserver communicates with the first server via a private network; retrieving, by the first server via a second server in communication with a first database, an encrypted list of computing devices having authorization to access one or more visual electronic files to determine a visual electronic file identifier satisfying the set of attributes of the request, wherein a user operating the user computing device is authorized to access a visual electronic file corresponding to the visual electronic file identifier accessible to the user computing device, wherein the first database is operationally in communication only with the second server, the second server configured to communicate only with the first server via a private network; retrieving, by the first server via a third server in communication with a second database, the visual electronic file, wherein the second database is operationally in communication only with the third server, the third server is configured to communicate only with the first server via the private network; upon displaying the visual electronic file on a graphical user interface on the user computing device, receiving, by the first server via the webserver, a confirmation input from the user computing device; updating, by the first server via the third server, a status in the second database corresponding to the confirmation input; and transmitting, by the first server, the visual electronic file to a fourth server configured to execute instructions on the visual electronic file.

In another embodiment, a computer system comprises a user computing device, a first server, a second server, a third server, a fourth server, the first server in communication with the user computing device, the second, third, and fourth servers, and configure to: receive, from the user computing device via a webserver, a request having a set of attributes, the first server having a private internet protocol address, wherein the webserver communicates with the first server via a private network; retrieve, via the second server in communication with a first database, an encrypted list of computing devices having authorization to access one or more visual electronic files to determine a visual electronic file identifier satisfying the set of attributes of the request, wherein a user operating the user computing device is authorized to access a visual electronic file corresponding to the visual electronic file identifier accessible to the user computing device, wherein the first database is operationally in communication only with the second server, the second server configured to communicate only with the first server via a private network; retrieve, via the third server in communication with a second database, the visual electronic file, wherein the second database is operationally in communication only with the third server, the third server is configured to communicate only with the first server via the private network; upon displaying the visual electronic file on a graphical user interface on the user computing device, receive, via the webserver, a confirmation input from the user computing device; update, by via the third server, a status in the second database corresponding to the confirmation input; and transmit the visual electronic file to the fourth server configured to execute instructions on the visual electronic file.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
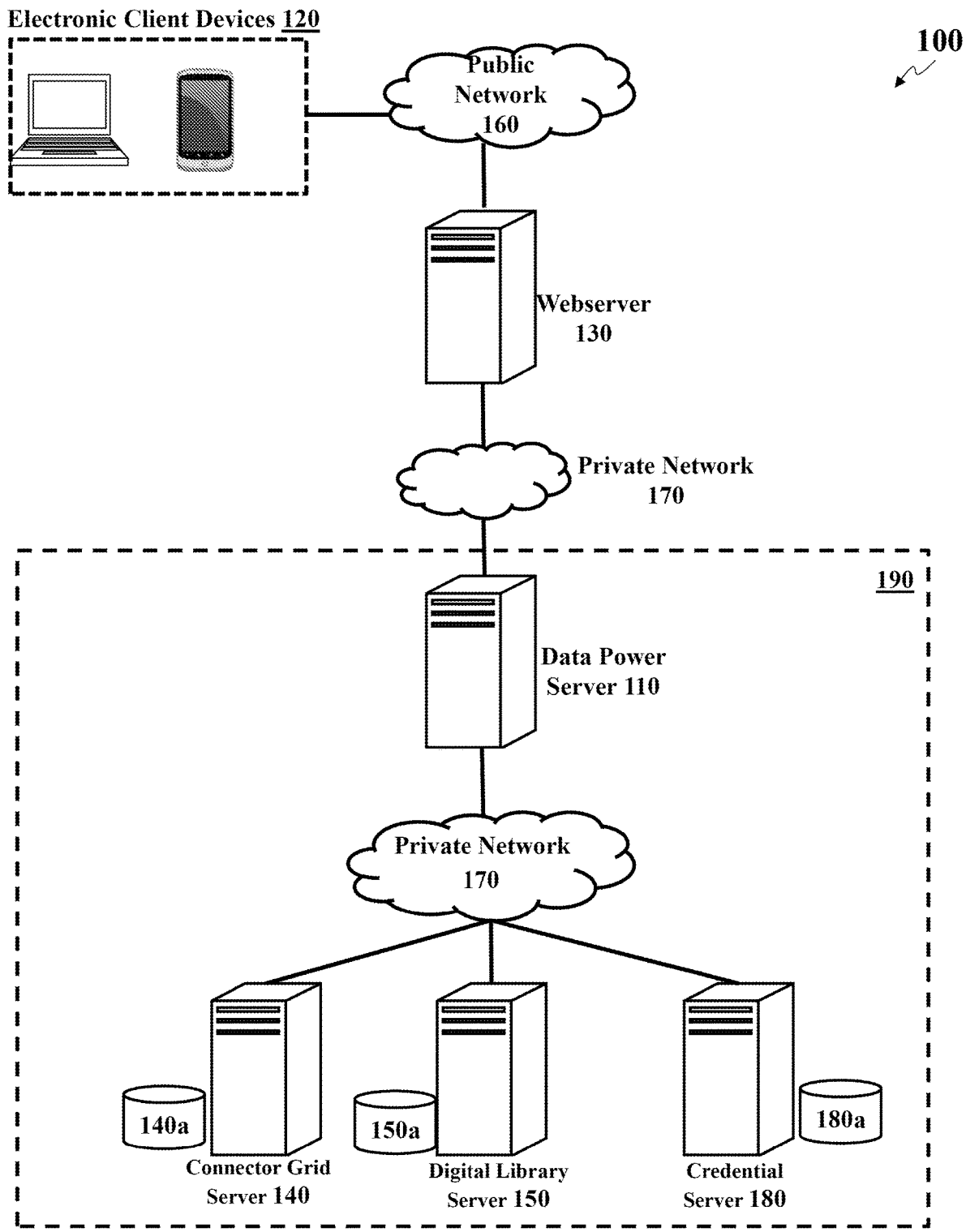
FIG. 1 illustrates a computer system for secure storage and retrieval of trade data, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide a system and method for secure storage and retrieval of trade data to enable efficient and secure trade data management. Specifically, a data power server may receive a request to review or confirm one or more trade documents via a webserver. For example, the user may first enter credential information to log into a user account of a website. The webserver may receive the user credential and communicate with a credential server to authorize the user. After the user logs into his/her account, the user may issue a request to review one or more trade documents. The data power server may receive the request via the webserver. The data power server may request a connector grid server to retrieve the user's accessible documents. The connector grid server may manage the accessibility of a set of electronic files for each user. The connector grid server may determine the electronic file identifiers (IDs) (e.g., names) that are accessible to the user based on the accessibility policy. The data power server may instruct a digital library server to download the electronic files (e.g., PDF documents) containing the requested trade data. The digital library server may retrieve and download the electronic files from the digital library based on the file IDs. The webserver may render a GUI displaying the electronic files on the electronic client device operated by the user. The user may review the trade data included in the electronic files that are displayed within the GUI and confirm or reject the trade data. The data power server may receive the user's response via the webserver. The data power server may instruct the digital library server to update the trade status based on the user's response.

FIG. 1 illustrates components of a system 100 for secure storage and retrieval of trade data, according to an embodiment. The system 100 may comprise a set of electronic client devices 120, a webserver 130, a data power server 110, a connector grid server 140 with a database 140a, a digital library server 150 with a digital library 150a, and a credential server 180 with a credential database 180a. The set of electronic client devices 120 may communicate with the webserver 130 via hardware and software components of one or more public networks 160. The data power server 110 may receive requests from the webserver 130 over a private network 170. In some embodiments, the data power server 110 may receive requests from the webserver 130 over the public network 160. The data power server 110 may communicate with the connector grid server 140, the digital library server 150, and the credential server 180 via hardware and software components of one or more private networks 170 within an internal subsystem 190. The data power server 110 may protect the architecture behind the web service interface from attacks. For example, the connector grid server 140, the digital library server 150 and the credential server 180 within the subsystem 190 may be only in communication with the data power server 110 via the private network 170, and may not be directly accessible to the webserver 130.

Even though, through this disclosure, certain aspects of the systems and method disclosed herein are described in the context of storage and retrieval of trade data, it is expressly understood that, in other embodiments, the systems and methods described herein could be used for storage and retrieval of other data as well.

Examples of the public network 160 include, but are not limited to, Local Area Network (LAN), Wireless Local Area Network (WLAN), Metropolitan Area Network (MAN), Wide Area Network (WAN), and the Internet. The communication over the network 160 may be performed in accordance with various communication protocols, such as Transmission Control Protocol and Internet Protocol (TCP/IP), User Datagram Protocol (UDP), and IEEE communication protocols. The private network 170 may be a network that uses private IP address space. Both the IPv4 and the IPv6 specifications define private addressing ranges. These private addresses may be commonly used for local area networks in residential, office, and enterprise environments. Private addresses may be commonly used in internal networks for security reasons. For example, private addresses in corporate network may be not accessible directly to the Internet for security reasons. A proxy, a gateway, or similar devices may provide restricted Internet access to internal networks. Because it is difficult for an Internet (external) host to connect directly to an internal system, private addresses may enhance network security for the internal system.

The set of electronic client devices 120 may be any computing device allowing a user to interact with the webserver 130. The electronic client device 120 may be any computing device comprising a processor and non-transitory machine-readable storage medium allowing the electronic client device 120 to perform the various tasks and processes described herein. The examples of the computing device may include, but are not limited to, a desktop computer, a laptop, a personal digital assistant (PDA), a smartphone, a tablet computer, and the like.

The electronic client device 120 may execute an Internet browser or local application that accesses the webserver 130 in order to issue requests or instructions. The electronic client device 120 may transmit credentials from client inputs to the webserver 130, from which the webserver 130 may communicate with the credential server 180 to authenticate the client and/or determine a client role. The electronic client device 120 may comprise any number of input devices configured to receive any number of data inputs, including various types of data inputs allowing for authentication (e.g., username, passwords, certificates, and biometrics). The electronic client device 120 may be configured to communicate with the webserver 130 through one or more networks 160, using wired and/or wireless communication capabilities.

The webserver 130, also called an HTTP server, may be any computing device comprising a process or any other computing hardware and software components, configured to host content, such as a website. A website is a collection of related web pages, including multimedia content, typically identified with a common domain name, and published on at least one webserver. A website may be accessible via one or more networks 160 including a public Internet Protocol (IP) network, such as the Internet. The webserver 130 may also comprise software that runs on the computing device that retrieves and delivers the web pages in response to requests from the electronic client device 120. Web pages are documents, typically composed in plain text interspersed with formatting instructions of Hyper Text Markup Language (HTML, XHTML). The webserver 130 may transport the web pages with Hypertext Transfer Protocol (HTTP), which may optionally employ encryption (HTTP Secure, HTTPS) to provide security and privacy for the user. Web pages can be viewed or otherwise accessed from a range of computer-based and Internet-enabled electronic devices of various sizes, including desktop computers, laptops, PDAs and cell phones.

In operation, the user may launch a website in an Internet browser or a local application on the electronic client device 120. The user may first enter credential information such as username, password, certificate, and biometrics to log into a user account of a company website hosted on the webserver 130. The electronic client device 120 then transmits the user inputs to the webserver 130 for authentication. The webserver 130 may communicate with a credential server 180 that manages all the user credentials in a centralized way. The webserver 130 may communicate with the credential server 180 via the data power server 110.

The credential server 180 may be any computing device comprising a processor and other computing hardware and software components, configured to manage user credentials. The credential server 180 may receive the user credential from the webserver 130 and access a centralized credential database 180a configured to store all user credentials to determine whether a set of entered credentials (purportedly authenticating the user) match an appropriate set of credentials that identify and authenticate the user. The credential server 180 may send the response on whether the user can log into the user account to the webserver 130.

The credential database 180a may be any non-transitory machine-readable media configured to store data. Specifically, the credential database 180a may include username, passwords, certificates, and biometrics, and any other information that can be used to authenticate the user's ID.

After the user logs into a user account, the webserver 130 may receive a request from the electronic client device 120. The request may comprise a set of attributes. For example, the user may issue a request requesting to review or confirm one or more trades on certain products within a certain period of time. Because the requested trade data may be highly sensitive, the embodiments disclosed herein may deploy data power server 110 to protect such sensitive data. Specifically, the webserver 130 may send the request to the data power server 110. The data power server 110 may be a private server of the company that is not directly accessible by the public. For example, the users may not be able to directly access the data power server 110. However, the webserver 130 may have a public IP address that is accessible by all the users. As a result, the webserver 130 may receive the user's request and forward the request to the data power server 110. The data power server 110 may be configured to satisfy the user requests.

The data power server 110 may be a family of pre-built, pre-configured rack mountable network devices, such as XML (eXtensible Markup Language) appliances that can help accelerate XML and web services deployments while extending SOA (service oriented architecture) infrastructure. The data power server 110 may comprise many specialized hardware components, including ASIC (application-specific integrated circuit)-based IPS (intrusion prevention system), custom encrypted RAID (redundant array of independent disks) drives, and hardware security modules. The data power server 110 may operate a single digitally signed firmware containing a Linux-based operating system and application stack. The data power firmware runs on a flash storage device. IBM refreshes and enhances the data power firmware image every 10-20 weeks. Users cannot run third party applications on the data power server as the third party applications would need a traditional server and operating system. Instead of a traditional file system, the data power server 110 runs with a collection of isolated virtual file systems called "Application Domains." As a result, data power server 110 may appear to its client connections to be any type of network file system with any type of folders and links. The data power server 110 may perform transformation and routing of messages as an enterprise service bus or protect web services interfaces and the architecture behind the web service interfaces from attacks.

The connector grid server 140 may be a private server configured to communicate only with the data power server 110 via one or more private networks 170. The connector grid server 140 may be configured to manage accessibility of visual electronic files. The data power server 110 may receive the user's request, and communicate with the connector grid server 140 to determine whether the user has the authority to access the requested electronic files/documents. The connector grid server 140 may be any computing device comprising a processor and other computing hardware and software components, configured to manage the accessibility of a set of electronic files for each user. For example, the connector grid server 140 may comprise a database 140a including a list of user devices having authorization to access one or more visual electronic files, such as PDF documents.

The connector grid server 140 may determine the electronic file IDs requested by the user and check whether the user has the authority to access such electronic files. Specifically, the connector grid server 140 may check the user attributes, the electronic client device 120 attributes, the request attributes including where the request comes from, the IP address of the electronic client device 120, the user's role based on the user credential, the requested operation (e.g., reading or writing) and any other related information. The connector grid server 140 may determine the visual electronic file IDs (e.g., names) that are accessible to the user based on the accessibility policy contained in the database 140a. By check the accessibility of the electronic files and the user's limits of authority, the connector grid server 140 may protect the electronic files by only allowing the user to access the electronic files within his/her authority.

The database 140a may be any non-transitory machine-readable media configured to store data. Specifically, the database 140a may include information of the user ID (identifier), the user device ID or IP address, the set of visual electronic file IDs accessible to the user or user device, the file access permissions that control the ability of the user to view, change and execute the set of visual electronic files, and any other related information. The database 140a may be a database operationally in communication only with the connector grid server 140.

The digital library server 150 may be a private server configured to communicate only with the data power server 110 via one or more private networks 170. The digital library server 150 may be configured to manage the storage of financial data (e.g., visual electronic files) of all users. The digital library server 150 may be any computing device comprising a processor and other computing hardware and software components, configured to manage the financial data of all of the users in a centralized way. The digital library server 150 may store the visual electronic files containing the sensitive financial data, such as trade data, into the digital library 150a.

The digital library 150a may be an online database of digital objects that can include text, still images, audio, video, or other digital media formats. Objects can consist of digitized content like print or photographs, as well as originally produced digital content like word processor files or social media posts. In addition to storing content, digital libraries provide means for organizing, searching, and retrieving the content contained in the collection. The digital content may be stored locally, or accessed remotely via computer networks. The digital library 150a may be a database operationally in communication only with the digital library server 150.

After the connector grid server 140 determines that the requested electronic files are accessible to the user, the data power server 110 may instruct the digital library server 150 to download the electronic files (e.g., PDF documents). The digital library server 150 may retrieve and download the visual electronic files (e.g., PDF documents) from the digital library 150a based on the file IDs. The digital library server 150 may send the downloaded visual electronic files to the webserver 130. The webserver may render a GUI displaying the visual electronic files on the electronic client device 120. The user may review the trade data included in the visual electronic files that are displayed within the GUI and determine if the trade data are correct. The GUI may also include one or more interactive graphical components that enable the user to confirm or reject the trade data. After the user interacts with a certain interactive element of the GUI generated by the webserver 130, the data power server 110 may receive the user's confirmation input via the webserver 130. The data power server may instruct the digital library server 150 to update the trade status based on the user's confirmation response in the digital library 150a. The data power server 110 may further send the visual electronic files to another trade server (not shown) and instruct the trade server to perform the trade after the trade data is confirmed.

Figure 2:
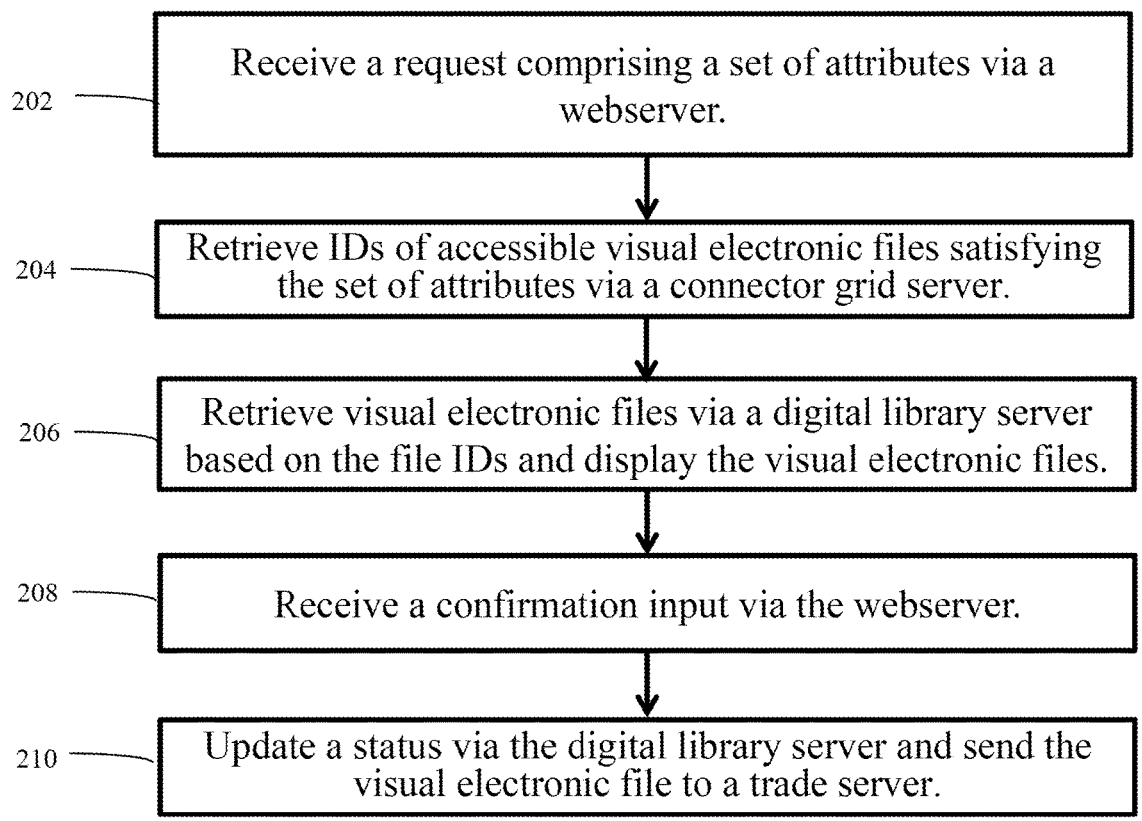
FIG. 2 illustrates a flowchart depicting operational steps for secure storage and retrieval of trade data, according to an embodiment.

FIG. 2 illustrates execution of a method 200 for secure storage and retrieval of trade data, according to an embodiment. Other embodiments may comprise additional or alternative steps, or may omit some steps altogether. Even though certain aspects of the embodiments described herein are described to be performed by different servers (e.g., data power server, credential server, grid server, and digital library server), in some embodiments, the functionality described herein may be performed by a single server configured to perform the steps described herein.

At step 202, the data power server may receive from the electronic client device a request via the webserver. The request may have a set of attributes. The data power server may have a private IP address. The webserver may communicate with the data power server via a private network. A user operating an electronic client device may input user credential to log into a user account of a company website. In operation, the user may launch a website in an Internet browser or a local application on the electronic client device. The user may first enter credential information such as username, password, certificate, and biometrics. The electronic client device may transmit the user inputs to the webserver for authentication. In some embodiments, the webserver may receive the user credential and communicate with a credential server that manages all the user credentials in a centralized way to authenticate the user. The webserver may communicate with the credential server via the data power server.

The credential server may receive the user credential from the webserver and access a centralized credential database configured to store all user credentials to determine whether a set of entered credentials (purportedly authenticating the user) match a stored record of an appropriate set of credentials that identify and authenticate the user. The credential server may send the response on whether the user can log into the user account to the webserver.

After the user logs into a user account, the webserver may receive a request from the electronic client device. The request may comprise a set of attributes. For example, the user may issue a request requesting to review or confirm one or more trades on certain products within a certain period of time. The webserver may send the request to a data power server. The data power server may be a private server of the company that is not directly accessible by the public. The data power server may have a private IP address. For example, the users (through his or her electronic client device) may not be able to directly access the data power server. The webserver may have a public IP address that is accessible by all the users. The webserver may communicate with the data power server via a private network.

The requested trade data may be data generated and stored when the user first performs one or more trades at an earlier time. For instance, when a user requests a trade by inputting pertinent trade information in a GUI of a website displayed on the electronic client device, the webserver receiving the trade information may generate a PDF document (or any other visual electronic file) comprising the trade data (e.g., a set of attributes associated with the trade) and the user profile data. The webserver may transmit the generated PDF document to the data power server. The data power server may further communicate with the connector grid to determine the accessibility of the PDF document. The connector grid may generate an entry in the local database to record the generated PDF document ID, the accessibility of the PDF document (e.g., the user IDs and/or device IDs that have authority to access the PDF document), the user's access permission (e.g., read, write, execute) of the PDF document based on the trade attributes and user attributes. The data power server may also communicate with the digital library server. The digital library server may upload such a PDF document to the digital library.

At step 204, the data power server may retrieve IDs of accessible visual electronic files satisfying the set of attributes via a connector grid server. The data server may retrieve, via the connector grid, an encrypted list of computing devices having authorization to access one or more visual electronic files to determine the visual electronic file IDs satisfying the set of attributes. Furthermore, the user may be authorized to access the visual electronic files corresponding to the visual electronic file IDs. The connector grid server may be a private server configured to communicate only with the data power server via one or more private networks. The connector grid may comprise or in communication with a database. The database may be operationally in communication only with the connector grid server.

The connector grid server may manage the accessibility of electronic files for each user. For example, the connector grid server may comprise a local database including a list of users and/or user devices having authorization to access one or more visual electronic files, such as PDF documents containing the trade information. Specifically, the list in the database may include the user ID, the user device ID or IP address, the file identifiers of the set of visual electronic files accessible to the user, the file access permissions that control the ability of the user to view, change and execute the set of visual electronic files.

The connector grid server may serve as a first layer of protection of sensitive financial data. Specifically, the connector grid server may check the user attributes, the electronic client device attributes, the request attributes including where the request comes from, the IP address of the electronic client device, the user's role based on the user credential, the requested operation (e.g., reading or writing) and any other related information. The connector grid server may determine the visual electronic file IDs (e.g., names) that satisfy the request comprising a set of attributes and are accessible to the user (e.g., the user is authorized to access the visual electronic file corresponding to the visual electronic file IDs). The connector grid server may encrypt the visual electronic file IDs and return the encrypted visual electronic file IDs to the data power server. By checking the accessibility of the electronic files and the user's limits of authority, the connector grid server may protect the electronic files by only allowing the user to access the electronic files within his/her authority.

At step 206, the data power server may retrieve the visual electronic files via a digital library server based on the visual electronic file IDs. The digital library server may be a private server configured to communicate only with the data power server via one or more private networks. The digital library server may comprise or in communication with a digital library. The digital library may be a database operationally in communication only with the digital library server.

The data power server may decrypt the encrypted visual electronic file IDs and instruct the digital library server to download the visual electronic files (e.g., PDF documents) based on the visual electronic file IDs. In some embodiments, the data power may transmit the encrypted visual electronic file IDs to the digital library server. The digital library server may decrypt the visual electronic file IDs. The PDF documents may include highly sensitive financial data of the users. To protect such sensitive data, the digital library server may save the PDF documents into a centralized digital library.

When a user requests to review/confirm the trade data as described in step 202, the data power server may communicate with the connector grid server that may determine the accessibility of the requested PDF documents as described in step 204, the digital library server may only retrieve the requested documents when the user is authorized to access the requested electronic files. By storing the financial data into digital library server, the data power server may provide a second layer of protection. No applications or users can directly access the digital library to retrieve the financial data. Any requests trying to access the digital library have to go through the two layers of protection.

The digital library server may retrieve and download the visual electronic files (e.g., PDF documents) based on the file IDs. The digital library server may send the downloaded visual electronic files to the data power server, which further send the visual electronic files to the webserver. The webserver may display a GUI comprising the visual electronic files on the electronic client device.

At step 208, the data power server may receive a confirmation input from the electronic client device via the webserver. The user may review the trade data included in the visual electronic files that are displayed within a GUI and determine if the trade data are correct. The GUI may also include one or more interactive graphical components that enable the user to select different options. For example, the GUI may include an interactive graphical component (e.g., button, dropdown menu) for confirming the trade data and another interactive graphical component (e.g., button, dropdown menu) for rejecting the trade. If the user determines the trade data are correct, the user may confirm the trade by interacting with the confirming interactive component. If the user determines the trade data are not correct, the user may reject the trade by interacting with the rejecting interactive component. After the user interacts with a certain interactive element of the GUI generated by the webserver, the data power server may receive the user's response via the webserver.

At step 210, the data power server may update the trade status via the digital library server and transmit the visual electronic file to a trade server. In operation, the data power server may instruct the digital library server to update the trade status based on the user's confirmation input in the digital library. As discussed above, the digital library may store all the sensitive financial data of users' trades. After the user confirms or rejects the trade data, the data power server may instruct the digital library server to do the corresponding update. For example, the digital library server may update a status of the trade data in the digital library corresponding to the confirmed or rejected status based on the user's response. The data power server may further send the visual electronic files to another trade server and instruct the trade server to perform the trade after the trade data is confirmed. Alternately, the data power server may take appropriate actions for rejected trade. For example, the data power server may instruct the webserver to generate a GUI comprising a text-based interface for the user to input reasons of rejecting the trade data.

Having two separate servers (connector grid server and digital library server) where neither server communicate via a public protocol minimizes the risk of a successful cyber-attack. For instance, a cyber/security attacker must successful gain access to three different servers to identify access authorization and where the file is stored in order to access a file.

Figure 3:
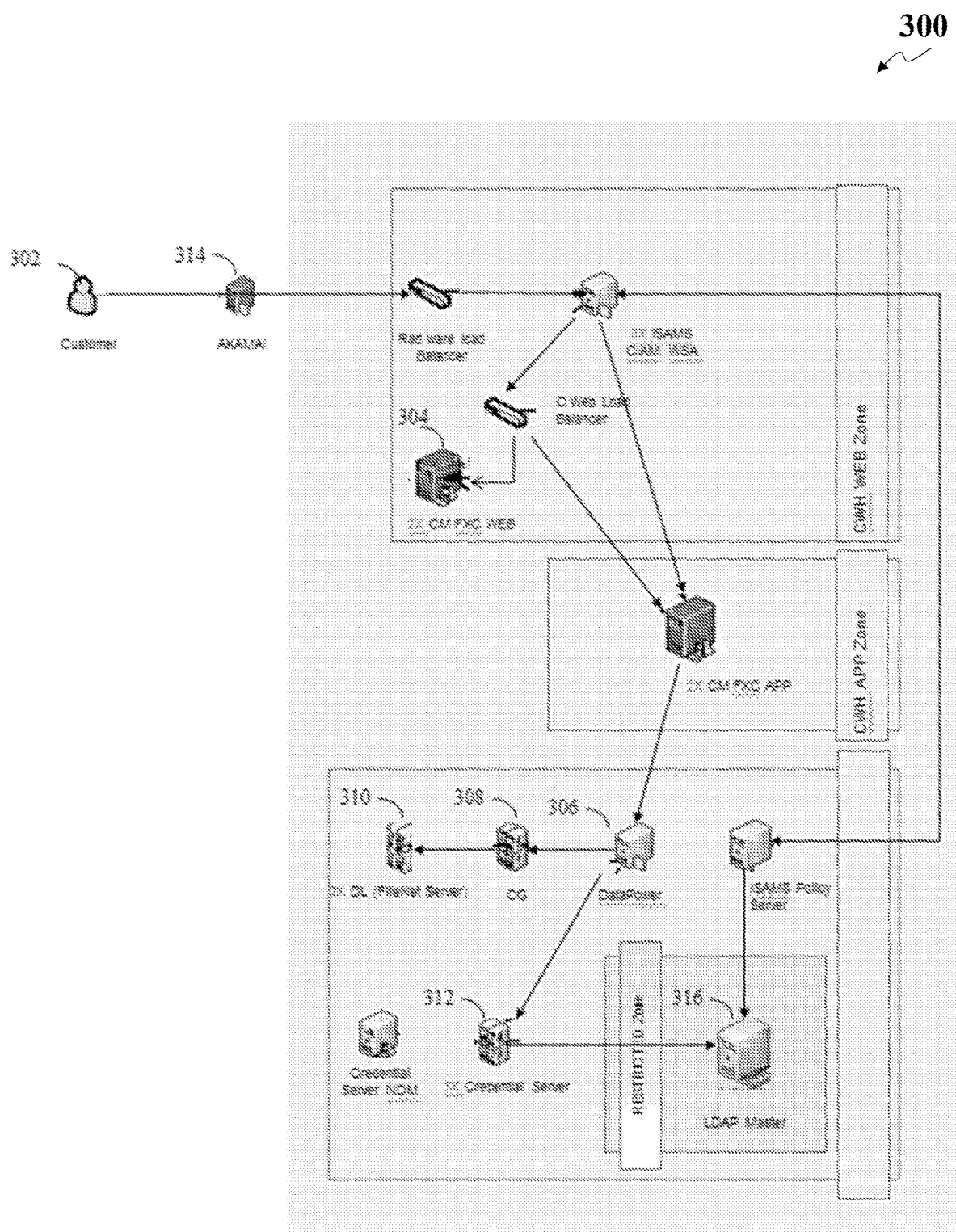
FIG. 3 illustrates an example of the process for secure storage and retrieval of trade data, according to an embodiment.

FIG. 3 illustrates an example 300 of the process for secure storage and retrieval of trade data, according to an embodiment. A user/customer 302 may try to log into a user account to perform one or more trades. For example, the user 302 may launch a website in an Internet browser or a local application on an electronic client device. The user may first enter credential information such as username, password, certificate, and biometrics to log into a user account of a company website hosted on the webserver 304. The electronic client device of the user 302 then transmits the user inputs to the webserver 304 for authentication. The webserver 304 may communicate with a credential server 312 that manages all the user credentials in a centralized way. The webserver 304 may communicate with the credential server 312 via the data power server 306. The credential server 312 may manage the user credentials using lightweight directory access protocol (LDAP) 316. The credential server 312 may receive the user credential from the webserver 304 and authenticate the user when the user credential matches a stored record. After the user logs into the user account, the user may perform a trade. For example, the user may request to buy $100 of stock A, and $300 of stock B.

The webserver 304 may receive the user request and generate an electronic file (e.g., PDF document) comprising the metadata of the trades requested by the user. The communication between the user 302 and the webserver 304 may be through Akamai 314, which is a content delivery network and cloud service provider. The webserver may send such PDF document to the data power server 306. The data power server 306 may communicate with the connector grid server 308 to determine the accessibility of the document. The connector grid server 308 may determine the accessibility of the PDF document based on the trade attributes and the user attributes. The connector grid server 308 may generate an entry or a table that includes the PDF document ID, the user IDs and/or device IDs that have authority to access the PDF document, the user's access permission of the PDF document. The data power server 306 may also communicate with the digital library server 310 to store the document. The digital library server 310 may upload the PDF document into the digital library.

At a later time, the user 302 may request to review or confirm the one or more trades. The user 302 may log into the user account after the credential server authorizes the user. The user 302 may issue a request to review the trades performed on stock A and stock B. The webserver 304 may send the request to the data power server 306. The data power server 306 may receive the user's request, and communicate with the connector grid server 308 to determine whether the user has the authority to access the requested electronic files/documents. The connector grid server 308 may manage the accessibility of a set of documents for each user, including the user ID, the user device ID or IP address, the set of visual electronic files accessible to the user, the file access permissions that control the ability of the user to view, change and execute the set of documents.

After the connector grid server 308 determines that the requested electronic files are accessible to the user 302, the data power server 306 may instruct the digital library server 310 to download the electronic files (e.g., PDF documents). The digital library server 310 may retrieve and download the visual electronic files (e.g., PDF documents) from the digital library based on the file IDs. The digital library server 310 may send the downloaded visual electronic files to the webserver 304 via the data power server 306. The webserver may render a GUI displaying the visual electronic files on the electronic client device of the user 302. The user 302 may review the trade data included in the electronic files that are displayed within the GUI and confirm or reject the trade data. The data power server 306 may receive the user's response via the webserver 304. The data power server 306 may instruct the digital library server 310 to update the trade status based on the user's response. Upon the user confirming the trade, the data power server 306 may send the electronic file to a trade server (not shown) to conduct the trade.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
    receiving, by a first server, from a computing device, a request to access an electronic file;
    retrieving, by the first server communicating with a second server in communication with a first database, a list of computing devices having authorization to access the electronic file, wherein the first database is operationally in communication only with the second server and not the first server; and
    upon authenticating the computing device:
        retrieving, by the first server communicating with a third server in communication with a second database, the electronic file authorized to be accessed by the computing device, wherein the second database is operationally in communication only with the third server and not the first server, wherein the first server is a data power server configured to satisfy user requests, the second server is a connector grid server configured to manage accessibility of the set of electronic files, and the third server is a digital library server configured to manage storage of the set of electronic files;
        receiving, by the first server, a confirmation input from the computing device; and
        instructing, by the first server, the third server to update a data record associated with the electronic file with a status corresponding to the confirmation input in the second database.

2. The method of claim 1, wherein the computing device communicates with the first server via a public network.

3. The method of claim 1, wherein at least one of the second server communicated with the first database via a first private network or the third server communicates with the second server via a second private network.

4. The method of claim 1, wherein the electronic file is a portable document format (PDF) document.

5. The method of claim 1, further comprising:
displaying, by the first server, one or more interactive graphical components configured to receive the instruction from the user computing device.

6. The method of claim 1, wherein the first server is a private server that is not directly accessible to the computing device.

7. The method of claim 1, wherein retrieving the list of computing devices having authorization to access the electronic file comprises retrieving a set of computer identifiers.

8. A system comprising:
a first server comprising a processor and a non-transitory computer-readable medium containing instructions that when executed by the processor causes the processor to perform operations comprising: receiving from a computing device, a request to access an electronic file;
retrieve, by communicating with a second server comprising a processor, in communication with a first database, a list of computing devices having authorization to access the electronic file, wherein the first database is operationally in communication only with the second server and not the first server; and
upon authenticating the computing device:
retrieve, by communicating with a third server comprising a processor, in communication with a second database, the electronic file authorized to be accessed by the computing device, wherein the second database is operationally in communication only with the third server and not the first server, wherein the first server is a data power server configured to satisfy user requests, the second server is a connector grid server configured to manage accessibility of the set of electronic files, and the third server is a digital library server configured to manage storage of the set of electronic files;
receive, by the first server, a confirmation input from the computing device; and
instruct the third server to update a data record associated with the electronic file with a status corresponding to the confirmation input in the second database.

9. The system of claim 8, wherein the computing device communicates with the first server via a public network.

10. The system of claim 8, wherein at least one of the second server communicated with the first database via a first private network or the third server communicates with the second server via a second private network.

11. The system of claim 8, wherein the electronic file is a portable document format (PDF) document.

12. The system of claim 8, wherein the instructions further cause the first server to display one or more interactive graphical components configured to receive the instruction from the user computing device.

13. The system of claim 8, wherein the first server is a private server that is not directly accessible to the computing device.

14. The system of claim 8, wherein retrieving the list of computing devices having authorization to access the electronic file comprises retrieving a set of computer identifiers.

15. A computer system comprising:
a first server having a first processor;
a second server having a second processor;
a third server having a third processor;
the first server in communication with the second server and third server, the first server configured to:
receive, from a computing device, a request to access an electronic file;
retrieve, by communicating with the second server in communication with a first database, a list of computing devices having authorization to access the electronic file, wherein the first database is operationally in communication only with the second server and not the first server;
upon authenticating the computing device:
retrieve, by communicating with the third server in communication with a second database, the electronic file authorized to be accessed by the computing device, wherein the second database is operationally in communication only with the third server and not the first server, wherein the first server is a data power server configured to satisfy user requests, the second server is a connector grid server configured to manage accessibility of the set of electronic files, and the third server is a digital library server configured to manage storage of the set of electronic files;
receive, by the first server, a confirmation input from the computing device; and
instruct the third server to update a data record associated with the electronic file with a status corresponding to the confirmation input in the second database.

16. The system of claim 15, wherein the computing device communicates with the first server via a public network.

17. The system of claim 15, wherein at least one of the second server communicated with the first database via a first private network or the third server communicates with the second server via a second private network.

* * * * *